United States Patent [19]

Yamaoka et al.

[11] Patent Number: 4,745,569

[45] Date of Patent: May 17, 1988

[54] DECIMAL MULTIPLIER DEVICE AND METHOD THEREFOR

[75] Inventors: Akira Yamaoka, Hadano; Kenichi Wada, Sagamihara; Kazunori Kuriyama, Hadano, all of Japan

[73] Assignee: Hitachi, Ltd., Tokyo, Japan

[21] Appl. No.: 686,692

[22] Filed: Dec. 27, 1984

[30] Foreign Application Priority Data

Dec. 28, 1983 [JP] Japan ................................ 58-246929

[51] Int. Cl.⁴ .............................................. G06F 7/52
[52] U.S. Cl. ...................................... 364/755; 364/759
[58] Field of Search ............... 364/755, 754, 759, 756, 364/757, 768, 758, 760

[56] References Cited

U.S. PATENT DOCUMENTS

| 3,293,420 | 12/1966 | Pitkowsky et al. | 364/760 |
| 3,500,026 | 3/1970 | Pokorny | 364/755 |
| 4,543,641 | 9/1985 | Fukuta et al. | 364/756 |
| 4,677,583 | 6/1987 | Ohtsuki et al. | 364/756 |

FOREIGN PATENT DOCUMENTS

| 119891 | 5/1976 | German Democratic Rep. | |
| 0159833 | 12/1979 | Japan | 364/755 |
| 0024645 | 3/1981 | Japan | 364/755 |
| 0119047 | 7/1983 | Japan | 364/755 |
| 60-247735 | 12/1985 | Japan | 364/755 |

OTHER PUBLICATIONS

Angiulli et al., *High Performance Two-Cycle Loop Decimal Multiply Algorithm*, IBM Technical Disclosure Bulletin, vol. 24, No. 4, Sep. 1981, pp. 1845-1849.

*Primary Examiner*—Gary V. Harkcom
*Assistant Examiner*—Long Nguyen
*Attorney, Agent, or Firm*—Antonelli, Terry & Wands

[57] ABSTRACT

A decimal multiplier device including a register A storing the multiplier, a register B storing the multiplicand, a shifter for outputting the output of the register A as it is or after having been shifted, based on a first signal, a gate for outputting the output of the register B or "0", based on a second signal, an adder/subtractor for adding the output of the shifter and that of the gate and storing the result thus obtained in the register A, and a decoder for receiving the value of a selected digit of the content of the register A and controlling the gate and the shifter by generating the first signal and the second signal based on the received value so that the multiplicand B is added n times, n corresponding to the received value, to the content of the register A or substracted (10−n) times therefrom. The register A, the shifter and the adder/subtractor form a single loop. Decimal multiplication is performed by controlling the shifter, when signals pass through the loop repeatedly.

12 Claims, 4 Drawing Sheets

FIG. 4

| | FLAG H | FLAG S | COUNTER M | L. 10 | FLAG H | FLAG S | COUNTER M | L. 11 | L. 12 | L. 13 | PERFORMANCE OF OPERATION | CORRESPONDENCE WITH STEPS IN FIG. 5 |
|---|---|---|---|---|---|---|---|---|---|---|---|---|
| a { | 0 | 0 | 0 (DON'T CARE) | 0 | 0 | 0 | 0 | 1 | 1 | 0 | $^0X+0$ | III |
| | | | | 1 | 0 | 0 | 0 | 1 | 0 | 0 | $^0X+Y$ | |
| | | | | 2 | 1 | 0 | 1 | 1 | 0 | 0 | $^0X+Y$ | I |
| | | | | 3 | 1 | 0 | 2 | 1 | 0 | 0 | $^0X+Y$ | |
| | | | | 4 | 1 | 0 | 3 | 1 | 0 | 0 | $^0X+Y$ | |
| | | | | 5 | 1 | 0 | 4 | 1 | 0 | 0 | $^0X+Y$ | |
| | | | | 6 | 1 | 1 | 3 | 1 | 0 | 1 | $^0X-Y$ | |
| | | | | 7 | 1 | 1 | 2 | 1 | 0 | 1 | $^0X-Y$ | |
| | | | | 8 | 1 | 1 | 1 | 1 | 0 | 1 | $^0X-Y$ | |
| | | | | 9 | 0 | 1 | 0 | 1 | 0 | 1 | $^0X-Y$ | IV |
| b { | | 1 | 1 (DON'T CARE) | 0 | 0 | 0 | 0 | 2 | 0 | 0 | $^9X+Y$ | V |
| | | | | 1 | 1 | 0 | 1 | 2 | 0 | 0 | $^9X+Y$ | |
| | | | | 2 | 1 | 0 | 2 | 2 | 0 | 0 | $^9X+Y$ | |
| | | | | 3 | 1 | 0 | 3 | 2 | 0 | 0 | $^9X+Y$ | |
| | | | | 4 | 1 | 0 | 4 | 2 | 0 | 0 | $^9X+Y$ | |
| | | | | 5 | 1 | 1 | 3 | 2 | 0 | 1 | $^9X-Y$ | |
| | | | | 6 | 1 | 1 | 2 | 2 | 0 | 1 | $^9X-Y$ | |
| | | | | 7 | 1 | 1 | 1 | 2 | 0 | 1 | $^9X-Y$ | |
| | | | | 8 | 0 | 1 | 0 | 2 | 0 | 1 | $^9X-Y$ | |
| | | | | 9 | 0 | 1 | 0 | 2 | 1 | 1 | $^9X-0$ | |
| c { d { | 1 | 0 | M ≤ 1 | (DON'T CARE) | 0 | 0 | 0 | 0 | 0 | 0 | X+Y | II |
| | | | M > 1 | | 1 | 0 | M:=M-1 | 0 | 0 | 0 | X+Y | |
| e { | | 1 | M ≤ 1 | (DON'T CARE) | 0 | 1 | 0 | 0 | 0 | 1 | X-Y | |
| | | | M > 1 | | 1 | 1 | M:=M-1 | 0 | 0 | 1 | X-Y | |

FIG. 5

| EXAMPLE | 1012 X 902 = 912824 | |
|---|---|---|
| STEP NUMBER | (REG. A) : X | (REG.B) : Y |
| STEP 0 | 0000902C | 10120000 |
| I | X ← ⁰X + Y<br>101209OC | 10120000 |
| II | X ← X + Y<br>202409OC | 10120000 |
| III | X ← ⁰X + 0<br>0202409C | 10120000 |
| IV | X ← ⁰X − Y<br>9008240C | 10120000 |
| V | X ← ⁹X + Y<br>0912824C | 10120000 |

⁰X 00000902
Y 10120000 (+
10120902

⁰X 00202409
Y 10120000 (−
90082409

⁹X 99008240
Y 10120000 (+
09128240

DECIMAL MULTIPLIER DEVICE AND METHOD THEREFOR

BACKGROUND OF THE INVENTION

This invention relates to a decimal multiplier device and method therefor.

An example of the conventional decimal multiplication method is indicated in FIG. 1. In this example a decimal multiplication is effected by using a register A storing a multiplier, a register C storing a multiplicand, two registers B and D, whose initial value is 0 and which store partial products, a multiplier decoder 3, which extracts one digit of the multiplier from the register A and controls an adder 1 and a gate 4, a shifter 2 and a selector 5. That is, on digit "n" of the content of the register A, i.e. the multiplier is extracted. The content X of the register B and the content of the register C, i.e. the multiplicand, multiplied by n are added by controlling the multiplier decoder 3 depending on n, and the result thus obtained is returned to the register B. This is the multiplication process for one digit, and multiplications for every digit of higher rank are effected successively. For this purpose digit shifts are effected according to the following procedure. The partial product for the one digit mentioned above is stored in the register B. This content is shifted by one digit (here one digit is represented by 4 bits) toward right by the shifter 2 (0 0 0 0 binary are filled in the leftmost digit). The result is set in the register B and the one digit pushed out from the right end is given at the left end of the shift register D, whose content is shifted by one digit toward right. That is, when the registers B and D are considered to be a series of registers, the whole is shifted by one digit toward right, the lower order digits in the partial product are stored in the register D and the higher order digits are stored in the register B. The multiplication process is effected by both the inner loop adding the multiplicand n times, where n is one digit extracted from the multiplier, and the outer loop repeating the shift described above for the succeeding digits and the product can be obtained in the registers B and D.

Further, in another example, when one digit extracted from the multiplier, n, is great (e.g. equal to or greater than 6), the multiplicand Y is subtracted (10−n) times from the content X of the register B representing the higher order digits of the partial product and in the addition subtraction loop for the digit which is higher by 1 than the current digit, addition is performed once more (or subtraction is performed once less). This method, by which the number of additions/subtractions is reduced as a whole in order that operation speed is increased, is widely utilized.

As described above, in the decimal multiplication method indicated in FIG. 1, there are following problems preventing the speed-up of the operation.

(i) The operation is implemented by the two loops, i.e. the inner loop for addition/subtraction and the outer loop for shifting every digit, and these procedures in the different loops are performed separately.

(ii) Since the partial products obtained in the course of an operation are stored in the register B and the register D in a divided manner in the shifting of every digit, it is necessary to use a register which is twice as long as the ordinary register (that is, the registers B and D should be considered as a series of registers).

(iii) Since the final result i.e. the product is obtained in the register B and the register D separately, two parts sould be combined in one result and thus many subsequent procedures are necessary after the product has been calculated.

SUMMARY OF THE INVENTION

An object of this invention is to resolve these problems and to provide a decimal multiplication method and device, by which the functions of the inner loop for addition/subtraction and the outer loop for shifting by one digit are implemented in a single loop.

Another object of this invention is to provide decimal multiplier device and method therefor, by which both the multiplier and partial products are stored in one common register and no time is needed for subsequent combining a plurality of parts stored in different registers into one final result which shortens the operation time.

BRIEF DESCRIPTION OF THE DRAWINGS

FIG. 4 explains the operation mode of the decoder 20 in FIG. 3; and

FIG 5 explains the multiplication operation according to the decimal multiplication method of this invention.

DESCRIPTION OF THE PREFERRED EMBODIMENTS

Figure 1:
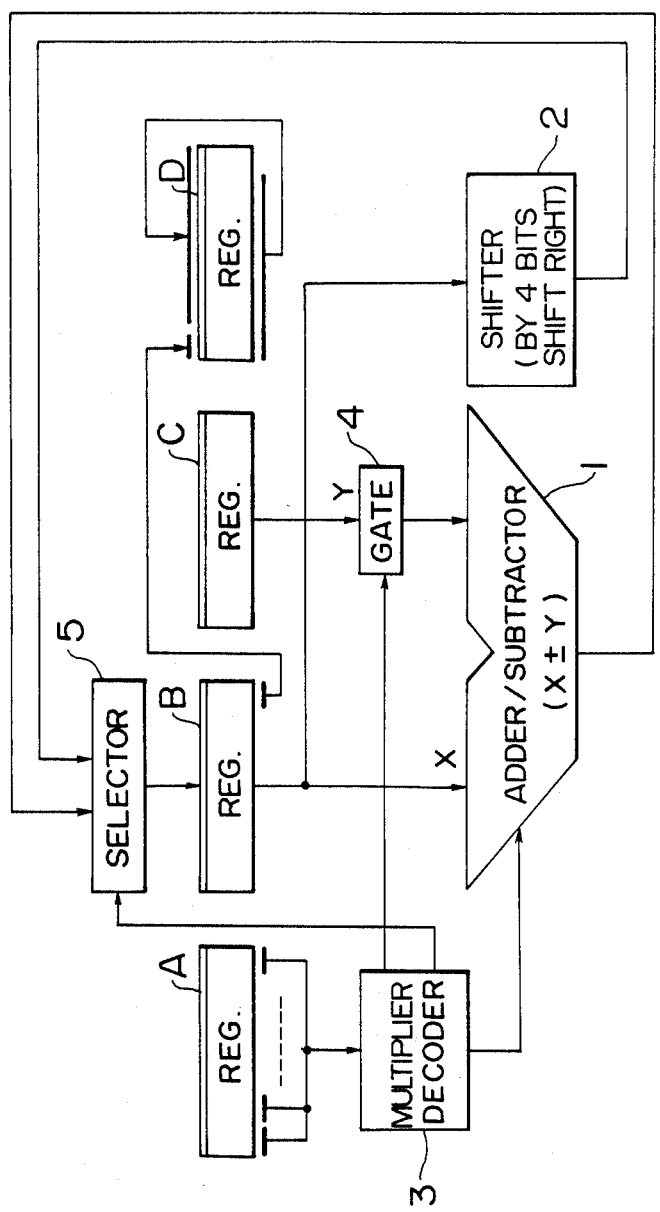
FIG. 1 is a block diagram for explaining a conventional decimal multiplication method.

Hereinbelow an embodiment of this invention, referring to the drawings will be explained.

Figure 2:
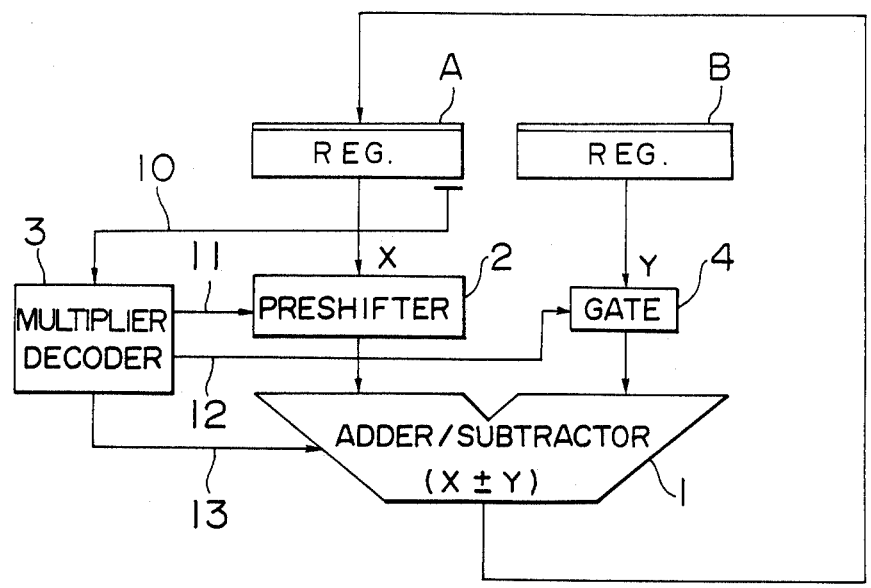
FIG. 2 is a block diagram for explaining an embodiment of this invention.

FIG. 2 is a block diagram for explaining the embodiment of this invention.

The decimal multiplication in this embodiment is implemented by using a register A storing the multiplier and partial products, a register B storing the multiplicand, a decimal adder/subtractor 1, a preshifter 2 having the function to shift arithmetically the content by one decimal digit toward right, a multiplier decoder 3 extracting successively one digit of the multiplier in the register A from the least significant digit via the line 10 and controlling the operation, and a gate 4 making the register B output zero, permitting a +0 or −0 operation.

The outline of the performance indicated in FIG. 2 will be explained.

Between two operands to be multiplied together the operand which is greater in absolute value is called a multiplicand and the other is called a multiplier. The latter is stored in the register A. The multiplicand without sign is shifted by the number of digits, which is equal to the number of digits of the multiplier, toward left and stored in the register B. In this case, for a multiplication having such a specification that it is premised that its operation results, i.e. its product can be stored in one register, even if the multiplicand is shifted toward left, no effective digits spill from the register. Alternatively, this number of meaningful digits can also be determined by the position of the most significant digit, that is not "0", of the multiplier including the sign part.

One digit of the multiplier is extracted through the line 10 from the register A. The multiplier decoder 3 decodes this digit and controls the adder 1, the preshifter 2 and the gate 4.

Figure 3:
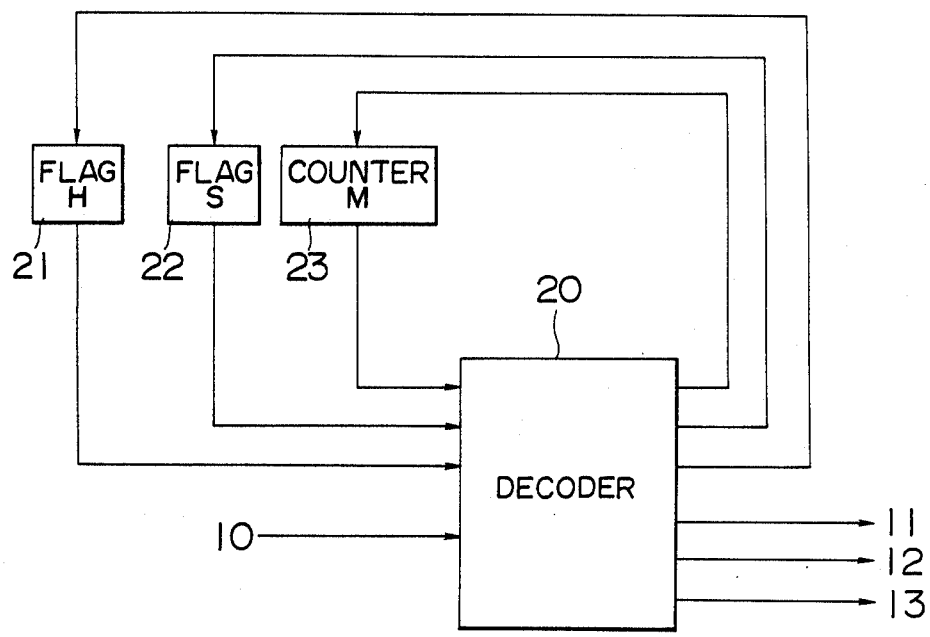
FIG. 3 is a block diagram showing the construction of the multiplier decoder 3 in FIG. 2.

FIG. 3 indicates a block diagram of the multiplier decoder 3 and FIG. 4 shows details of the performance of the decoder 20. The multiplier decoder 3 is provided with a flag H 21 which indicator whether the operation is the first addition/subtraction among the additions/subtractions corresponding to the one digit of the multiplier mentioned above (32 0) or not (=1), a flag S 22 which shows whether it is an addition (=0) or a subtraction (=1), and a counter M 23 storing the remaining times (0-4) of additions/subtractions which are to be effected for the one digit of the multiplier mentioned above.

Hereinbelow the performance of the multiplier decoder 3 will be explained, where the mark "$^0X$" means that the content "X" of the register A is shifted by one digit, i.e. 4 bits toward the right and a decimal "0" (=0 0 0 0 binary) is filled in the digit at the left end, which is vacant. Such a shift operation is realized, when the line 11 from the decoder 20 is "1" by the preshifter 2.

Further, the mark "$^0X+Y$" means that "$^0X$", for which the content "X" of the register A is shifted by one digit toward right and a decimal "0" (=0 0 0 0 binary) is filled in the digit at the left end, and the content "Y" of the register B is added.

Still further, the mark "$^9X$" means that the content "X" of the register A is shifted by one digit toward right and a decimal "9" (=1 0 0 1 binary) is filled in the digit at the left end, which is vacant. Such a shift operation is realized, when the line 11 from the decoder 20 is "2", by the preshifter 2.

In the state where the initial value of both the flags is 0, i.e. H=0, S=0 as indicated at the upper part a of FIG. 4, the values shown in FIG. 4 are outputted at the flags H 21, S 22, the counter M 23, and the lines from 11 to 13 according to the value of the line 10.

When the line 12 is "0", the gate 4 is switched on and the content of the register B is outputted as it is. To the contrary, when the line is "1", the gate 4 is switched off and the input of the adder subtractor 1 is set to "0". When the line 13 is "0", an addition is effected at the adder/subtractor 1 and when it is "1", a subtraction is effected there. For example, at the state H=0, S=0, when the line is from "1" to "5", the decoder 20 sets 1, 0 and 0 at the lines 11, 12 and 13, respectively, and $^0X+Y$ is operated.

To the contrary, when the line 10 is from "6" to "9", the decoder 20 sets 1, 0 and 1 at the lines 11, 12, and 13, respectively, and $^0X-Y$ is operated.

Further, when the line 10 is "0", the decoder 20 sets 0, 0 and 0 at the lines 11, 12 and 13, respectively, and $^0X+0$ is operated. By this way, either one of $^0X+0$, $^0X+Y$ and $^0X-Y$ is operated by controlling the preshifter 2, the gate 4 and the adder/subtracter 1, depending on the value of the lines 11, 12 and 13.

When the line 10 is from "2" to "8", H=1. This means that the addition/subtraction for that digit has not been finished and at the next cycle the state of the performance proceeds to the condition indicated at the lowest section c of FIG. 4, H=1. Further, when the line 10 is from "6" to "9", S=1, what means that the addition/subtraction for that digit is a subtraction.

The condition H=0 and S=1 means that the current addition/subtraction is the first addition/subtraction corresponding to one digit of the multiplier and that the operation effected for the preceding digit was a subtraction. Under this condition the flags H 21, S 22 and the counter M 23 are set as indicated in the middle section b of FIG. 4, depending on the value of the line 10 and at the same time one of the operations $^9H+Y$, $^9X-Y$ and $^9X-0$ is effected.

Under this condition since the operation performed on the preceding digit was a subtraction, it is necessary to effect for the current digit an addition once more or a subtraction once less. Consequently, when the line 10 is from "1" to "7", H=1, and when it is from 5 to 9, S=1.

The condition H=1 and S=0 means that the current operation is a second or one of the succeeding operations and that operation is an addition. Under this condition the flag H is set to 0 (M≦1) or 1 (M>1), while the flag S is set to 0, as indicated in d of the lowest section c of FIG. 4, depending on the content of the counter M 23 showing the remaining number of additions and the content of the counter M 23 is reduced by 1. In addition the line 11 is set to 0 so that the content X of the register A can pass through the preshifter 2 as it is; the line 12 is set to 0 so that the content Y of the register B can pass through the gate 4; and the line 13 is set to 0 so that these X and Y are added in the adder/subtractor 1. This operation is denoted by X+Y.

The condition H=1 and S=1 means that the current operation is a second or one of the succeeding operations and that operation is a subtraction. Under this condition the flag H is 0 (M≦1) or 1 (M>1) while the flag S is set to 1, as indicated in e of the lowest section c of FIG. 4, depending on the content of the counter M 23 showing the remaining number of subtractions and the content of the counter M 23 is reduced by 1. At the same time X−Y is operated. That is, the content of the register B is subtracted from the content of the register A in FIG. 2 in the adder/subtractor 1.

That is, under the condition H=1, depending on the value of the flag S, additions or subtractions are effected, until the contents of the counter M 23 becomes smaller than 1. Then when the addition/subtraction before the last for that digit has completed, H is set to 0 and the operation returns either to the highest section a or to the middle section b in FIG. 4.

By the process indicated above the operations for one digit has completed.

The desired product can be obtained by repeating additions/subtractions similar to those described above until the operations for the most significant digit among the meaningful digits of the multiplier have completed.

In order to show more specifically the performance of the multiplication indicated in FIGS. 2 to 4, the method according to this invention will be explained referring to a practical example. FIG. 5 illustrates the contents of the registers A and B in every step during the multiplication operation according to the decimal multiplication method of this invention. Here 1012×902=912824 is cited as an example.

Step 0 in the Figure indicates the contents set in the registers A and B before the beginning of the multiplication. For simplicity it is supposed that the lengths of the registers A and B are both 4 bytes and their contents are indicated in 8 digits in the binary-coded decimal representation. Since 1012>902, "902" whose absolute value smaller is the multiplier and is stored in the register A. "C" in hexadecimal standing at the right end is a mark meaning that "902" is positive. Including this mark, the effective number of digits is 4. Consequently, "1012"

whose absolute value in greater, is shifted by 4 digits toward left and stored in the register B.

The line 10 in FIG. 2 stands here at the second digit counted from the right end in the register A, which is indicated by a mark "⊔" in FIG. 5. For this example it is decimal "2" at first.

In Step I, H=0, S=0 and line 10="2". Referring to FIG. 4, put H=1, S=0 and M=1. At the same time the lines 11, 12 and 13 are set to 1, 0 and 0, respectively, and $^0X+Y$ is operated. That is, a value "1012090C" obtained by adding $^0X$="00000902" and Y="10120000" and replacing the rightmost digit (i.e., "2" in this case) with the positive mark "C" at the right end of the result thus obtained is stored in the register A.

In Step II, H=1, S=0 and M=1. Referring to FIG. 4, put H=0, S=0 and M=0. At the same time all the lines 11, 12 and 13 are set to 0 and X+Y is operated. That is, a value "2024090C" obtained by adding X="1012090C" and Y="10120000" and replacing the rightmost digit (i.e., "C" in this case) with the positive mark at the right end of the result thus obtained is stored in the register A.

In Step III, H=0, S=0 and line 10="0". Referring to FIG. 4, put H=0, S=0 and M=0. At the same time $^0X+0$ is operated. That is, a value "0202409C" obtained by replacing the rightmost digit (i.e., "0" in this case) with the positive mark to $^0X$="0202409C" is stored in the register A.

In Step IV, H=0, S=0 and line 10="9". Referring to FIG. 4, put H=0, S=1 and M=0 at the same time $^0X-Y$ is operated. That is, a value "9008240C" obtained by subtracting Y="10120000" from $^0X$="00202409" and replacing the rightmost digit (i.e., "9" in this case) with the positive mark to the result thus obtained is stored in the register A.

In Step V, H=0, S=1 and line 10="0". Referring to FIG. 4, put H=0, S=0 and M=0 and $^9X+Y$ is operated. That is, a value "0912824C" obtained by adding $^9X$="99008240" and Y="10120000" and replacing the rightmost digit (i.e., "0" in this case) with the positive mark at the right end is stored in the register A.

In this manner 1012×902=912824 can be obtained in the register A. Further, the multiplication completes at the step where the n-th H=0 is used, n being the number of meaningful digits of the multiplier including the positive mark, i.e. for this example, since H=0 is put for Steps from II to V except for Step I, it is the fourth in Step V and therefore the multiplication completes there.

As indicated above, according to this invention, by examining the number of meaningful digits of the multiplier including the sign and by joining the sign to the partial result of every addition/subtraction, it is possible to obtain the desired results of the operation with sign "0912824C" at the register A in the last step, and therefore to omit the step of the after-procedure of combining the products stretching over two adjacent registers or to add the sign thereto, which was heretofore necessary.

In addition, although the multiplier and the partial products have been stored in a same register, it is not necessary that they be stored in a same register. It is evident that they can be stored in different registers. Furthermore, owing to the separation of the registers in which they are stored, it is possible to separate the operation of the multiplier and the decoding from the addition/subtraction, and a method can be easily achieved, by which these processes, which were implemented in a same cycle in this example, are effected in different cycles and difficulties due to gate delay times etc., are relieved.

As explained above, according to this invention, in a decimal multiplication method, the process for adding-/subtracting the multiplicand according to the value of each digit of the multiplier and that for shifting the digits for the operation for the following digit can be achieved in a series of steps. According to this invention, since whether the preshifter should be shifted or not is judged by the multiplier decoder and applied to the preshifter, the multiplication process can be implemented only in one loop comprising registers, a preshifter and an adder/subtractor. Furthermore, since it is also possible to store the partial products and the multiplier in a same register, the subsequent procedures for combining a plurality of registers can be omitted. Consequently a speed-up of operations and the subsequent procedure is possible.

We claim:

1. A decimal multiplier device comprising:
   a register A for storing a multiplier;
   a register B for storing a multiplicand;
   a shifter for outputting the output of said register A as it is or after having shifted it, based on a first signal;
   a gate for outputting the output of said register B or "0", based on a second signal;
   an adder/subtractor for adding the output of said shifter and that of said gate and storing a result thus obtained in said register A; and
   means for receiving a selected digit of the content of said register A having a value and controlling said gate and said shifter by generating said first signal and said second signal, based on said received value, so that the multiplicand is added n times, n corresponding to said received value, to the content of said register A or subtracted (10−n) times therefrom.

2. A decimal multiplier device according to claim 1, wherein said register B retains the multiplicand at a position shifted toward a most significant bit of the register B by a number of effective digits of the multiplier.

3. A decimal multiplier device according to claim 2, wherein a number of digits is determined by the number of digits of the multiplier including a sign part.

4. A decimal multiplier device according to claim 1, wherein said multiplicand contains a sign part.

5. A decimal multiplier device according to claim 1, wherein said shifter shifts inputted data by one digit toward the right and puts "0" at the left end, when said first signal has a first value; it shifts the inputted data by one digit toward the right and puts "9" at the left end, when said first signal has a second value; and it doesn't shift the inputted data, when said first signal has a third value.

6. A decimal multiplier device according to claim 5, wherein said adder/subtractor adds the output of said shifter and the output of said gate or subtracts the latter from the former, based on a third signal, and
   said means for receiving and controlling said gate and said shifter generates said third signal, depending on whether said received value is greater than a predetermined value or not.

7. A decimal multiplier device according to claim 6, wherein said means for receiving and controlling said gate and said shifter generates said first signal, either one of said first value, and said second value, depending on whether the operation performed on the preceding digit of the multiplier was an addition or a subtraction.

8. A decimal multiplier device comprising:
a register A for storing a multiplier;
a register B for storing a multiplicand;
a shifter controlled by a judgment whether the output of the register A should be shifted right by one digit, based on a first signal;
an adder/subtractor for adding the output of said register B and that of said shifter and storing a result obtained in said register A; and
control means coupled to said register A, said shifter and said adder/subtractor, said control means receiving a selected digit of the content of said register A, making said judgment, generating said first signal, causing the contents of said register A, to be transmitted in sequence to said shifter and said adder/subtractor and; controlling said register A, said shifter and said adder/subtractor so that the result of a multiplication is obtained.

9. A decimal multiplier device, comprising:
operation means, responsive to an applied operating signal having a first or second level, for respectively performing addition or subtraction operations on two inputs applied thereto;
gate means connected to said operation means, responsive to an applied gate signal for transferring a first data representative of one of a binary coded decimal multiplier and a binary coded decimal multiplicand to said operation means as one of the two inputs when said gate signal has a first level; and
shifting means connected to said operation means for shifting output data from said operation means obtained as a result of a preceding operation so as to provide the shifted output data to said operation means as the other of the two inputs for a succeeding operation, said shifting means shifting the output data in response to an applied shifting signal having three values so that in response to one of the values a least significant digit thereof is shifted out and a digit of zero is added at a most significant digit position thereof, in response to another of the values the output data is shifted so that a least significant digit thereof is shifted out and a digit of nine is added at a most significant digit position thereof, and in response to a last value the output data is transferred without shifting, said shifting means providing said operation means with initial data equal to zero;
control means, connected to said operation means, said gate means and said shift means, and responsive to each of sequentially applied digits of a second data representative of the other of the multiplier and the multiplicand for selectively providing said operation, gate and shifting signals so that a cumulative sum of partial products of each digit of the second data and all digits of the first data is finally obtained by repetitive addition or subtraction by said operation means, said control means including means for providing the one or another of the values of the shifting signal when a new digit of the second data is applied thereto and for providing the last value of the shifting signal during repetition of addition or subtraction for the new digit.

10. A decimal multiplier device according to claim 9, further comprising:
a register A connected to an output terminal of said operation means and an input terminal of said shifting means for receiving and holding output data of said operation means;
a register B connected to said gate means for holding the first data; and
said register B holding the first data followed by a number of digits of zero which number is not less than a number of digits of the second data.

11. A decimal multiplier device according to claim 10, wherein said register A holds the second data at a less significant digit position thereof and zero's at a more significant digit position as initial data thereof; and
wherein said shifting means includes means for shifting output data of said operation means held by said register A and the second data held thereby together.

12. A decimal multiplier device comprising:
a register A for storing a first operand;
a register B for storing a second operand;
a shifter for outputting the output of said register A as it is or after having shifted it, based on a first signal;
a gate for outputting the output of said register B or "0", based on a second signal;
an adder/subtractor for adding the output of said shifter and that of said gate and storing a result thus obtained in said register A; and
means for receiving a selected digit of the content of said register A having a value and controlling said gate and said shifter by generating said first signal and said second signal, based on said received value, so that the second operand is added n times, n corresponding to said received value, to the content of said register A or subtracted (10−n) times therefrom.

* * * * *